United States Patent

Gauchet

[15] 3,643,970

[45] Feb. 22, 1972

[54] LOCKABLE SUSPENSION FOR VEHICLES

[72] Inventor: Yves M. Gauchet, Senlis, France
[73] Assignee: Societe Anonyme Poclain
[22] Filed: May 12, 1970
[21] Appl. No.: 36,551

[30] Foreign Application Priority Data

May 14, 1969 France.................................. 6915773

[52] U.S. Cl................................................280/124 F
[51] Int. Cl..................................................B60g 17/00
[58] Field of Search..............................................280/124 F

[56] References Cited

UNITED STATES PATENTS

| | | | |
|---|---|---|---|
| 3,156,481 | 11/1964 | Dangauthier | 280/124 F |
| 3,194,579 | 7/1965 | Peras | 280/124 F |
| 3,083,033 | 3/1963 | Fiala | 280/124 F |

*Primary Examiner*—Philip Goodman
*Attorney*—Delio and Montgomery

[57] ABSTRACT

In an hydraulic suspension system for the wheels of an axle of a vehicle such as a public works machine and with respect to the chassis of the vehicle, two separate suspension arms articulated to the chassis, a jack coupled between the chassis and each of the suspension arms, a resilient member arranged in the chamber of each jack wherein the resilient member is capable of being compressed by hydraulic fluid feeding the jack, a conduit connecting the chambers of the two jacks, and selective isolating means arranged between the chamber and on the conduit connecting the chambers of the two jacks, whereby the suppleness of each of the suspension arms is adjustable for road travel of the vehicle and the suspension arms are lockable for stability of the vehicle at a worksite.

4 Claims, 1 Drawing Figure

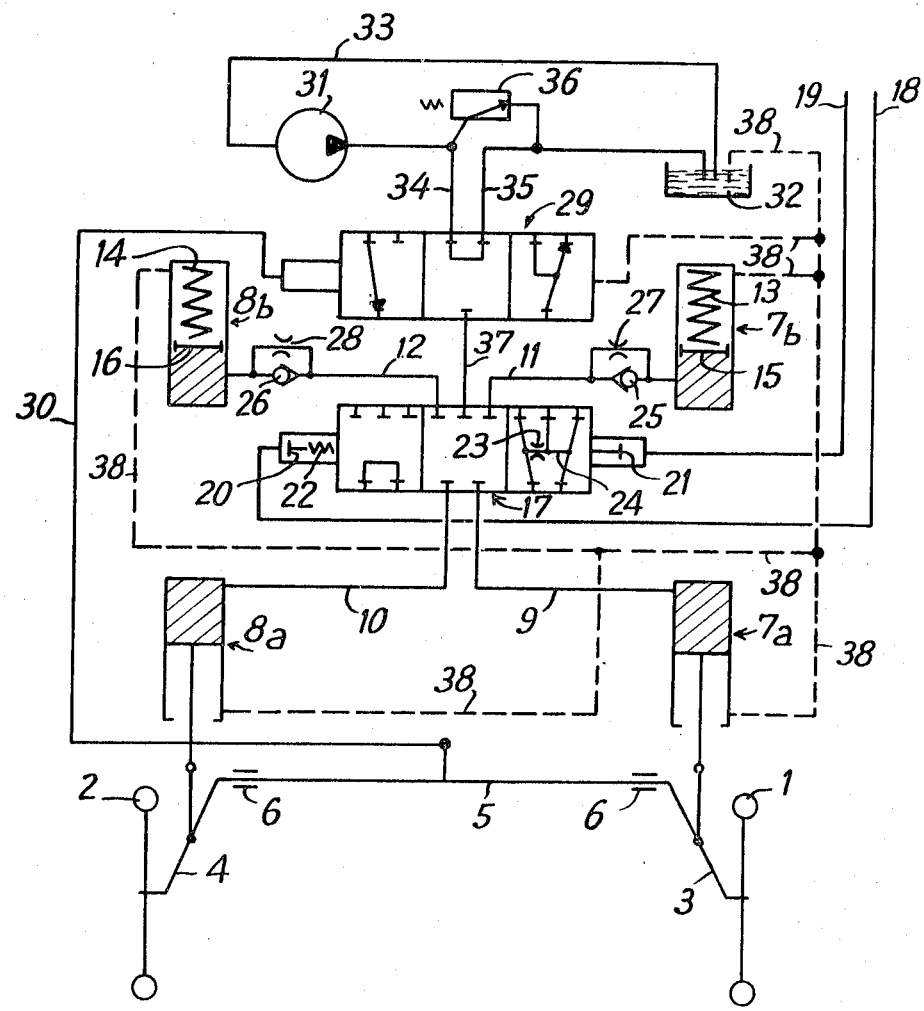

LOCKABLE SUSPENSION FOR VEHICLES

The present invention relates to lockable suspension for vehicles.

In the field of heavy vehicles, particularly that of public works machines, the suspensions which are at present used for the chassis on the rolling members have limited characteristics.

In particular, a relatively small suppleness is observed which does not enable any of the vehicles provided with such suspensions to reach road speeds comparable with those of light vehicles.

If on the contrary it is attempted to render the suspensions supple, the result is that functioning at the site is defective and the chassis is unstable, this consequently limiting the working performances of the machine.

The desired solution would be to have a supple suspension during road travel, which is instantaneously lockable without any complicated maneuver when the vehicle has arrived on site.

The invention in fact proposes such a solution which remedies the above-mentioned disadvantages of the heretofore known suspensions, whilst contributing new advantages.

The invention therefore has for its object a suspension of the wheels of an axle of a vehicle, such as a public works machine, with respect to the chassis of said vehicle constituted by two separate suspension arms articulated to the chassis, by a jack coupled between the chassis and each of the suspension arms, whilst a resilient member is arranged in the chamber of each jack and is capable of being compressed by the fluid feeding said jack and whilst a conduit connects the chambers of the two jacks.

Selectively isolating means are arranged between the chamber of each jack and the resilient member arranged in said chamber and on the conduit connecting the chambers of the two jacks.

According to an advantageous embodiment, each chamber is constituted by two elements connected together by a conduit, the resilient member arranged in the chamber being contained in one of the two elements of said chamber, whilst the selective isolating means are constituted by a distributor arranged on the conduits connecting the two elements of each of the chambers.

The distributor, interposed on the conduits connecting the two elements of each of the chambers preferably comprises at least two positions, the first of which corresponds to the communicating of the two elements of each chamber to each other and of the two chambers together, and the second to the isolation of the two elements from each chamber.

According to an advantageous variant embodiment, the distributor comprises a third position which may be combined with the first position, or with the first and second positions and which corresponds to the isolation of the elements of the chambers containing the resilient members and to the communication of the elements of the chambers other than those containing the resilient members.

The invention will be described in greater detail with reference to the accompanying drawings, in which:

The single FIGURE schematically shows a suspension according to the invention.

Referring now to the drawings, the invention is at present applied to the suspension of the right- and left-hand wheels 1 and 2 respectively on the axle of a public works machine. Each wheel is mounted to rotate at one of the ends of a suspension arm 3, 4, said arms being, in the present case, unitary with a torsion bar 5 by their other end. The torsion bar 5 is itself mounted to rotate in bearings 6 unitary with the chassis.

A jack coupled between the chassis and each of the suspension arms, is constituted by two separate elements 7a, 7b, and 8a, 8b. The two elements of the same jack are connected by a conduit in two parts 9, 11 and 10, 12.

Moreover, a resilient member 13, 14 is arranged in the chamber of each jack containing the pressurized fluid and is contained in a single element 7b, 8b of said jack.

The resilient member 13, 14 is constituted in known manner by a spring, for example metallic, isolated by a piston 15, 16 from the part of the element 7b, 8b capable of containing the pressurized fluid for feeding the jack. According to a different embodiment, which is also known, the resilient member 13, 14 is constituted by a deformable membrane, for example made of an elastomer, insulating a certain quantity of pressurized gas from the part of element 7b, 8b capable of containing the fluid feeding the jack. It is in any case essential that the resilient member 13, 14 can be compressed by the fluid for feeding the jack.

Moreover, the two parts 9, 11 and 10, 12 of the conduit connecting the two elements of the same jack are connected on either side of a three-way distributor 17, the parts 9 and 10 respectively connecting the elements 7a and 8a to one of the faces of the distributor 17, the parts 11 and 12 respectively connecting the elements 7b and 8b to the other face of the distributor 17.

This distributor 17 is, in the embodiment shown, a distributor comprising a slide whose position is remotely controlled, by means of conduits 18 and 19 conveying a fluid at a "control" pressure, and feeding the jacks 20 and 21 arranged on either side of the slide, the jack 21 acting moreover against the action of a spring 22.

The first position of the distributor 17 corresponds to the feed of a single jack 21. It ensures the communication between the conduits 9 and 11, 10 and 12, as well as of these two groups of conduits with each other. A narrow portion 23 is advantageously arranged on the conduit 24 communicating the two groups of conduits 9, 11 and 10 and 12, thus communicating the chambers of the two jacks.

The second position of the distributor 17 is obtained either by feeding the two jacks 20, 21 concomittantly, or on the contrary, by connecting their feed with the atmosphere. This position is that shown in the figure. It ensures the isolation of the different elements 7a, 7b, 8a, and 8b.

Finally, the third position of the distributor 17 is obtained by feeding only the jack 20. It ensures the isolation of the elements 7b and 8b of the jacks and the communication of the elements 7a and 8a.

In the field of vehicle suspensions, it is known that a compression stroke of the piston of the jack must be ensured with a small damping force and, on the contrary, an expansion stroke which is braked. To this end, in the suspension that has been described hereinabove, damping devices are inserted which ensure the desired functioning, as will be seen later. Each device comprises a nonreturn valve 25, 26 arranged on the conduit 11, 12 allowing the fluid to pass to the element 7b, 8b and a narrow portion 27, 28 arranged in shunt on the conduit 11, 12 on either side of the valve 25, 26.

Of course, the suspension according to the invention which was specified hereinabove, may be completed and combined with devices known per se, for automatically correcting the "set" of the vehicle or the choice of the average set, this signifying the position of this vehicle with respect to the ground, the distance from one point of the chassis with respect to the ground giving an approximation of what is understood by the expression "set."

In the suspension shown in the FIGURE, a three-way slide distributor 29 is arranged. The body of this slide being unitary with the chassis of the vehicle, the slide is connected by a resilient link 30 to the torsion bar 5, in the center of this bar 5, if the latter is symmetrical and homogeneous. The resilient link 30 has not been shown in detail as it is known per se. It will be specified that also in known manner, this link 30 may be adjusted by any suitable means, such as for example a handle or lever acting on a linkage and capable of being held in place at any selected position, that may be varied in continuous or discontinuous manner.

The installation is then completed by a pump 31 connected to a fluid tank 32 through an exhausting or suction conduit 33, and to the distributor 29 by a conduit 34. The return of the jack-feeding fluid is ensured through the conduit 35 connecting the distributor 29 to the tank 32. A discharge valve 36 is arranged on a shunt of the conduit 34 and is connected to the tank 32, whilst being connected for example to the conduit 35. A conduit 37 connects the distributors 17 and 29 and is capable of being placed in communication with the conduit 24 of the distributor 17, when said latter is at its first position. Finally, conduits 38 connect different members containing pressurized fluid to the tank 32 and thus direct the small leakage flow of said members towards the tank.

The slide of the distributor 29 ensures moreover the following functions: in its first position, or median position shown in the Figure, it directly communicates the conduits 34 and 35 and isolates conduit 37 from said conduits 34, 35; in a second position, it communicates conduits 34 and 37 and isolates conduit 35 from conduit 37; in its third position, it communicates conduits 37, 35 and 34.

The functioning of the suspensions according to the invention is very advantageous as will be seen hereinafter.

The case where the distributor 29 is held in its first position will firstly be examined. This arrangement means isolating the suspension from the pump 31 and the tank 32 and temporarily renders the resilient link 30 useless.

With the distributor 17 in its first position, the chassis rests on its wheels by means of the arms 3 and 4 held in a certain position with respect to the chassis by the action of the resilient forces of the members 13 and 14, volumes of fluid being contained in the chambers of each of the jacks in the elements 7a, 7b and 8a, 8b and compressing the members 13, 14.

In the inoperative position, there is no circulation of fluid in the conduit 24 between the chambers of the two jacks. However, should a wheel mount on a bump in the ground and/or the other go down into a cavity, the piston of one of the jacks of the element 8a, for example, then rises, whilst that of the element 7a descends. These movements, not necessarily synchronized, lead to the compression of the member 14 and to the expansion of the member 13 and tend to ensure a circulation of fluid of the jack 8a, 8b towards the jack 7a, 7b which circulation is moreover damped and braked by the narrow portion 23.

It will be noted that the action of the torsion bar 5 is in the present case that of a conventional antiroll bar and tends to return the suspension arms 3 and 4 towards a mean position which is identical for the two.

There may still be a variant operation, the distributor 17 still being in its first position. According to this variation, one of the suspension arms, arm 3 for example, remains immobile with respect to the chassis, whilst arm 4 is moving. The fluid which is for example driven from element 8a must necessarily be found in element 8b and compresses the resilient member 14, traversing the nonreturn valve 26 with a small resistance. On the contrary, when the resilient member 14 is going to expand and deliver fluid from the element 8b towards the element 8a, said fluid will have to cross the narrow portion 28 and, this time, overcome a considerable resistance.

The suppleness of the above suspension and its advantage for road transport as well as the possible adjustment of the "set," by communicating the conduit 24 with pump 31 or with the tank 32, by means for example of a distributor similar to 29, but positioned by hand at its second or third positions, will be seen. In this way, a complement of fluid delivered by the pump 31 may be made to penetrate through conduits 34 and 37 into the chambers of the jacks or, on the contrary, a certain quantity of fluid may be evacuated from the chambers of the jacks through the conduits 37 and 35 towards the tank 32, and therefore the average position of the chassis with respect to the ground may be raised or lowered.

It will furthermore be noted that the suspension of the vehicle is with "independent" wheels and has the advantages of road holding and stability of the vehicle inherent in this type of suspension.

In the second position of the distributor 17, the elements 7a, 7b, 8a, 8b are all isolated. The result of this arrangement is that the fluid contained in each element 7a, 8a is imprisoned in a given volume, so that the pistons of the elements 7a and 8a of the jacks are held immobile with respect to the bodies of said elements, therefore with respect to the chassis. In other words, the suspension arms 3 and 4 are rendered unitary with the chassis and the suspension is completely locked. This configuration is particularly advantageous whilst the operating equipment of the vehicle or the machine is working on the site. The possibility of locking the flexible suspension is new and widens the field of possible use.

In the third position of the distributor 17, the elements 7b and 8b are still isolated, but elements 7a and 8a are in communication through conduits 9 and 10. Thus a suspension with oscillating axle is obtained, one of the wheels necessarily rising when the other descends. This suspension has the known advantages of the suspensions of this type, in addition to that of the antiroll correction which has already been mentioned, contributed by the torsion bar 5.

Several noteworthy points will be noted, including the fact that it is necessary according to the invention to have at least two positions of the distributor 17, one corresponding to the obtaining of a flexible suspension, the other to the locking, at least partial, of said suspension. A distributor must thus necessarily have at least two positions, comprising for example the first and second or the first and third positions. Of course, it is certainly advantageous, and this is the preferred embodiment, to have a three-way distributor, such as distributor 17.

If the distributor 29 is now controlled by the resilient link 30 and concomittantly the distributor 17 is arranged in its first position, the set is automatically corrected, as is moreover known. However, the functioning will be briefly described.

With the vehicle being for example in inoperative position, its chassis is in equilibrium in its normal set. The resilient link 30 is itself in equilibrium and holds the distributor 29 in its first position, this bringing about the isolation of the jacks, the pump 31 and the tank 32, and the noncorrection of the set which, being good, remains good.

As long as the point of attachment of the flexible link 30 to the torsion bar 5 remains immobile, or when the two suspension arms 3 and 4 remain immobile, or when the wheels 1 and 2 move said arms 3 and 4 in opposite direction, symmetrically with respect to the average position and as long as the point of attachment of the link 30 is in the center of a torsion bar 5 which is symmetrical and homogeneous, there is no displacement of the slide of the distributor 29 from its first position. There is therefore no correction of the set, this being desired since the average set is then good and it is not desired to modify it.

Finally, when the arms 3 and 4 have various displacements which cause the point of attachment of the resilient link 30 to move on the torsion bar 5, said resilient link 30 tends to find its state of equilibrium again and to this end displaces the slide of the distributor 29 in one direction or the other. Said link will have been judiciously designed in order that, when the chassis has too low a set, the link 30 places the distributor in its second position, this permitting the normal set to be regained by injection of the fluid delivered by the pump 31 into the conduits 34 and 37, said liquid downwardly repelling the pistons of the elements 7a and 8a of the jacks, thus tending to raise the chassis with respect to the ground, so as to cause it to refind its normal set. This is a similar but complementary operation which would tend to bring the chassis having too high a set closer to the ground.

Finally, it is known that by acting discontinuously on the resilient link 30, discontinuous changes in the average set are caused by action of the slide of the distributor 29 which ensures the circulation of the fluid of the pump 31 towards the jacks, or from the jacks towards the tank 32, as long as it is away from its median position and is located in its second or third positions.

I claim:

1. In an hydraulic suspension system for the wheels of an axle of a vehicle such as a public works machine and with respect to the chassis of said vehicle, two suspension arms articulated to the chassis, a jack coupled between the chassis and each of the suspension arms, a resilient member arranged in the chamber of each jack wherein said resilient member is capable of being compressed by hydraulic fluid feeding said jack, a conduit connecting the chambers of the two jacks, and selective isolating means arranged between the chamber and on the conduit connecting the chambers of the two jacks, whereby the suppleness of each of said suspension arms is adjustable for road travel of the vehicle and said suspension arms are lockable for stability of the vehicle at a work site.

2. Suspension system according to claim 1, wherein each chamber is constituted by two elements connected together by a conduit, the resilient member arranged in the chamber is contained in one only of the two elements of said chamber, whilst the selective isolating means are constituted by a distributor arranged on the conduits connecting the two elements of each of the chambers.

3. Suspension as claimed in claim 2, wherein the distributor interposed on the conduits connecting the two elements of each of the chambers comprises at least two positions, the first corresponding to the communicating of the two elements of each chamber with each other and of the two chambers together, and the second position to the isolation of the two elements of each chamber.

4. Suspension as claimed in claim 2, wherein the distributor interposed on the conduits connecting the two elements of each of the chambers comprises at least two positions, the first corresponding to the communicating of the two elements of each chamber with each other, and of the two chambers together, and the second position to the isolating of the elements of the chambers containing the resilient members and to the communication of the elements of the chambers other than those containing the resilient members.

* * * * *